(12) United States Patent
Schmidt et al.

(10) Patent No.: US 11,478,767 B2
(45) Date of Patent: Oct. 25, 2022

(54) MOVABLE DEVICE FOR FILLING CATALYTIC REACTOR CHAMBERS

(71) Applicant: SODI-OSIS, Châteauneuf-les-Martigues (FR)

(72) Inventors: Christian Schmidt, Hoerdt (FR); Jean-Michel Plas, Le Havre (FR); Emmanuel Idczak, Graimbouville (FR)

(73) Assignee: SODI-OSIS, Châteauneuf-les-Martigues (FR)

( * ) Notice: Subject to any disclaimer, the term of this patent is extended or adjusted under 35 U.S.C. 154(b) by 324 days.

(21) Appl. No.: 16/638,740

(22) PCT Filed: Aug. 23, 2017

(86) PCT No.: PCT/FR2017/052264
§ 371 (c)(1),
(2) Date: Feb. 12, 2020

(87) PCT Pub. No.: WO2019/038483
PCT Pub. Date: Feb. 28, 2019

(65) Prior Publication Data
US 2021/0129101 A1 May 6, 2021

(51) Int. Cl.
*B01J 8/00* (2006.01)
*B01J 8/06* (2006.01)

(52) U.S. Cl.
CPC .......... *B01J 8/003* (2013.01); *B01J 8/06* (2013.01); *B01J 2208/00752* (2013.01); *B01J 2208/00769* (2013.01)

(58) Field of Classification Search
CPC .... B01J 8/003; B01J 8/06; B01J 2208/00752; B01J 2208/00769; B01J 2208/00778
See application file for complete search history.

(56) References Cited

U.S. PATENT DOCUMENTS 2,985,341 A    5/1961   Howell
3,788,370 A    1/1974   Hare
(Continued)

FOREIGN PATENT DOCUMENTS

CN    105658317 A    6/2016
CN    105874111 A    8/2016
(Continued)

OTHER PUBLICATIONS

Notice of Rejection issued in Japanese Patent Application No. 2020-506897 dated Jul. 20, 2021, with English translation.

*Primary Examiner* — Lessanework Seifu
(74) *Attorney, Agent, or Firm* — BakerHostetler

(57) ABSTRACT

A movable device for filling one or more chambers with solid particles in the divided state, the device includes a movable frame, metering means for metering the solid particles comprising two or more metering plates comprising one or more perforations, the metering plates being arranged on top of one another such that the perforation or perforations of one metering plate is/are in connection with the perforation or perforations of the metering plate situated below and/or above it, so as to form one or more metering columns intended to be placed in connection with the chamber or chambers, means for simultaneously releasing the solid particles from the metering means to the chamber or chambers, a storage tank for storing the solid particles, which comprises a bottom pierced with through-holes that are connected with, or can be placed in connection with, the metering column or columns, and comprising unloading means for releasing the solid particles from the storage tank to the metering column or columns.

13 Claims, 4 Drawing Sheets

(56) References Cited

U.S. PATENT DOCUMENTS

| | | |
|---|---|---|
| 9,649,783 B2 | 5/2017 | Barabas |
| 10,604,866 B2 | 3/2020 | Masuda et al. |
| 2016/0220974 A1 | 8/2016 | Schmidt |

FOREIGN PATENT DOCUMENTS

| | | |
|---|---|---|
| CN | 106061698 A | 10/2016 |
| CN | 205849817 U | 1/2017 |
| DE | 10 2016 101 508 B3 | 5/2017 |
| EP | 2 191 889 A1 | 6/2010 |
| WO | 2015/036693 A1 | 3/2015 |

MOVABLE DEVICE FOR FILLING CATALYTIC REACTOR CHAMBERS

CROSS-REFERENCE TO RELATED APPLICATIONS

This application is a National Stage of International patent application PCT/FR2017/052264, filed on Aug. 23, 2017, the disclosure of which is incorporated by reference in its entirety.

FIELD OF THE INVENTION

SUBJECT OF THE INVENTION

The present invention relates to a movable device for filling at least one chamber with solid particles in the divided state, more particularly for filling a plurality of chambers of a fixed catalyst bed reactor, of industrial type, it being possible for the chambers to be tubes arranged substantially in parallel in the reactor.

BACKGROUND

Fixed catalyst bed reactors are widely used in the chemical or electro-chemical, petroleum or petrochemical industry. They are usually formed by a multitude of reaction chambers, generally several thousands of tubes arranged vertically and substantially parallel to one another, and they possess the particular feature of having a significant length relative to their diameter, typically a ratio that may be of the order of 100 or more.

The reaction chambers are filled with a catalytic material—a catalyst—in the form of solid particles in the divided state, which may, for example, have the form of balls, cylindrical granules, rods or pellets, generally having a diameter or a length of the order of 5 to 10 mm. This catalytic material may be more or less fragile, depending on its form and its composition and, in particular, it may be friable.

Given the form and the size of the reaction chambers, their filling with the catalytic material may prove to be problematic. Indeed, each chamber has to be filled in a controlled fashion and in a precise manner, without degradation to the catalyst particles.

As manually loading the multitude of chambers is tedious, time-consuming and costly in terms of reactor production downtime, it has been proposed to use devices comprising measures of catalysts comprising a specific quantity of catalyst, the operator placing the measures opposite to each chamber to be filled and the catalyst being poured into the chambers, generally using a funnel.

The production and the handling of such measures, the conveying of the catalyst through the funnels, and the repetition of the operations mean that this loading method is of random quality.

It has also been proposed to use devices that allow both the metering of the catalyst and the filling of the chambers.

For example, document U.S. Pat. No. 2,985,341 describes a device comprising a multitude of vertical measuring tubes and comprising means for controlling the filling of these measuring tubes, which have the form of flexible tubes that are compressed in order to prevent the entry and/or the exit of the catalyst into/from these measuring tubes.

Document U.S. Pat. No. 3,788,370 describes a device comprising a reservoir for temporary storage of the particles, an overflow reservoir underneath the temporary storage reservoir, vertical measuring tubes traversing the bottom of the overflow reservoir, means for leveling the particles in the measuring tubes, means for recovering the surplus particles that have been discharged into the overflow reservoir, and positioning means for locating the measuring tubes above tubes to be filled.

Document WO2015036693 describes a device comprising vertical metering columns, means for releasing the catalyst toward a sleeve opening out toward the tube to be filled, these means having the form of a movable slide valve, arranged under the metering columns, the device further comprising vibration means for facilitating the passage of the catalyst from the metering columns toward the tube via the sleeves.

Nevertheless, in such devices, the catalyst particles may become clogged, particularly at the entry of but also along the metering columns. This drawback is all the more marked in the case of reactors in which the chambers may comprise a plurality of layers of catalytic material of different natures, with, in particular, granule sizes that decrease from the top layer to the bottom layer.

Furthermore, given the fragility, friability and the composition of the catalytic material, which generally comprises compounds that in certain cases are toxic, including heavy metals, it is appropriate to prevent or at the very least to minimize the generation and dispersal of dust so that operatives responsible for filling the chambers have zero or minimum exposure thereto.

In the case of a metering and filling device, document WO2015036693 describes the use of means for recovering the dust formed by pouring the catalyst into the chambers of the reactor, these recovery means being arranged between the system for metering the device and the chambers of the reactor.

SUMMARY OF THE INVENTION

An object of the present invention is to provide a device for metering and filling at least one chamber, preferably of a fixed catalyst bed reactor, with solid particles that does not have the prior-art drawbacks.

An object of the present invention is to provide an alternative to existing prior-art solutions.

An object of the present invention is to provide a device in which filling with and/or discharging solid particles is/are improved, rendering the device more efficient, more precise and more constant in terms of filling the chamber or chambers of the reactor.

A further object of the present invention is to provide a device that safeguards the handler against potential releases of dust while the device is being handled.

The present invention relates to a movable device for filling one or more chambers with solid particles in the divided state, the device comprising a movable frame, means for metering the solid particles, comprising two or more metering plates comprising one or more perforations, the metering plates being arranged one on top of another such that the perforation(s) of one metering plate is or are in connection with the perforation(s) of the adjacent metering plate such as to form one or more metering columns intended to be placed in connection with the chamber or chambers, means for simultaneous release of the solid particles from the metering means toward the chamber or chambers, a tank for storing the solid particles that comprises a bottom wall comprising perforations that are or may be placed in connection with the metering column or columns, and comprising unloading means that release the solid particles from the storage tank toward the metering column or columns.

According to particular embodiments of the invention, the device according to the invention comprises at least one or any appropriate combination of the following features:

- one of the two metering plates, or a first series of metering plates, is or are fixed relative to the frame of the device, and the other plate, or a second series of metering plates, is or are movable relative to said metering plate or plates, in a substantially horizontal movement,
- the movement of the movable metering plate or plates is achieved by means of a camshaft, the cams of which come into contact with at least one edge of said movable plate or plates,
- the device according to the invention comprises means for leveling the metering of solid particles comprising a movable, optionally removable, intermediate plate passing from a "closed" position, in which a portion of the metering column or columns is closed off, to an "open" position, allowing the release of the solid particles in the portion of the metering column or columns, and vice versa, or the leveling means being formed by the metering plates, all, or only some, of which are removable,
- the movable intermediate plate comprises perforations that, when the movable intermediate plate assumes the "closed" position, are not in connection with the metering column or columns and are in connection with the metering column or columns when the movable intermediate plate assumes the "open" position,
- the metering column or columns has or have a substantially conical form,
- the means for unloading the storage tank comprise a movable unloading plate passing from a "closed" position, in which the particles are held in the storage tank, to an "open" position allowing the release of the solid particles from the storage tank toward the metering column or columns, and vice versa, or the unloading means are formed by perforations of the storage tank that are not or are only partially opposite to the opening of the metering column or columns before and during receipt of the solid particles in the storage tank,
- the device according to the invention further comprises means for recovering the dust formed by and during the use of said device, comprising first means arranged at the storage tank of the solid particles and second means arranged at the junction between the metering means and the chamber or the chambers of the reactor.

The present invention also relates to the use of the device according to the invention for metering and filling one or more chambers of a fixed catalyst bed reactor with solid particles of catalyst in the divided state.

The present invention further relates to a method for metering and filling one or more chambers, comprising the steps of taking the device according to the invention and arranging it above the chamber or chambers such that the metering column or columns is or are in connection with the upper opening of the chamber or chambers, pouring solid particles in the divided state into the storage tank, the unloading means of which are in the closed position, the simultaneous release means being inactivated, distributing the solid particles in the storage tank, activating the unloading means such as to release the solid particles into the metering column or columns, filling the metering column or columns with the solid particles until flush with the bottom of the storage tank or flush with the upper opening of the metering column or columns, discharging the surplus of the solid particles from the storage tank toward a recovery tank, opening the means for simultaneous release of the solid particles such as to fill the chamber or chambers of the reactor and to close same when said chamber or chambers is or are filled.

According to particular embodiments of the invention, the method according to the invention comprises at least one or any appropriate combination of the following features:

- the method further comprises a step of activating means for vibration or oscillation of the storage tank before and/or during the activation of the unloading means and/or a step of activating the means for vibration or oscillation of the metering means before and/or during the filling and/or the unloading of the metering column or columns,
- the method further comprises a step of activating the means for recovering the dust at the storage tank during the step of pouring the solid particles into the storage tank and/or during the activation of the unloading means and/or a step of activating the means for recovering the dust at the junction between the metering means and the chamber or the chambers,
- the method further comprises a preliminary step of calibrating the device according to the invention by adjusting the height of the metering column or columns, adding or removing metering plates and/or using an intermediate plate arranged between metering plates such as to form a given height for a metering column, the intermediate plate passing from the closed position to the open position before or concomitantly with the activation of the simultaneous release means,
- the method further comprises a step of checking the filling of the chamber or of the chambers and, if the filling thereof is insufficient, repeating the steps of the method according to the invention, possibly with the exception of the step of calibrating the device, until the required height of solid particles in said chamber or chambers has been achieved.

DETAILED DESCRIPTION

In the remainder of the description and the claims, the terms "top", "bottom", "upper", "lower", "vertical" or "horizontal" refer to the normal vertical position of use of the device 1 according to the invention.

Figure 1:
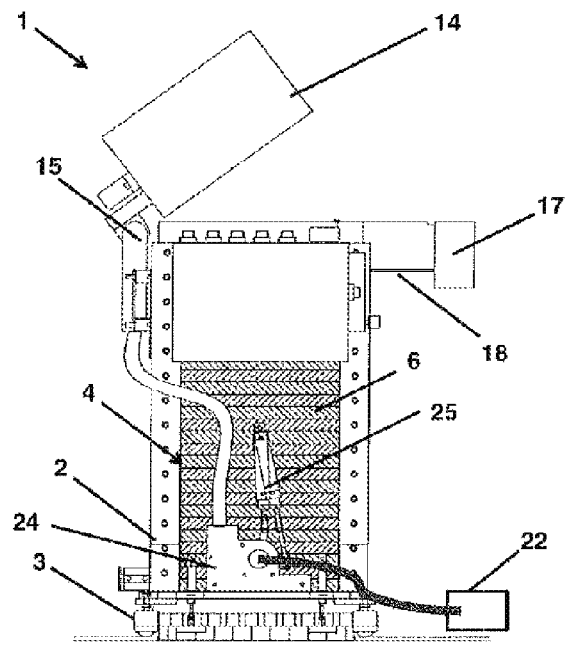
FIG. 1 is a schematic view of a first side of a particular embodiment of the device according to the invention, in which the storage tank is movable and partially raised.
Figure 2:
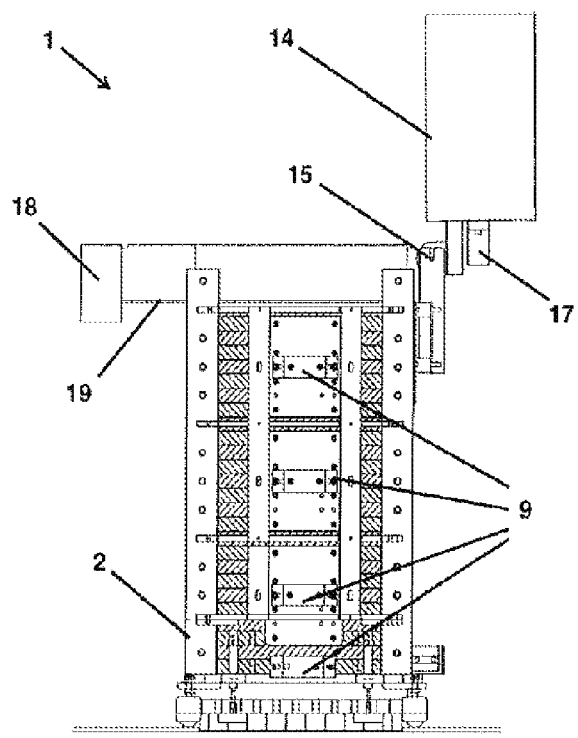
FIG. 2 is a schematic view of the opposite side from that shown in FIG. 1 and in which the storage tank is completely raised.

The device 1 according to the invention is a movable device. Preferably, it comprises a frame 2 of parallelepipedal form, provided with movement means 3 such as, for example, wheels or casters (FIG. 1).

The device 1 comprises means 4 for metering solid particles 5, preferably a catalyst, comprising at least two rigid metering plates 6 arranged horizontally and stacked on one another. Preferably, the device comprises a multitude of metering plates 6 stacked on one another (FIGS. 1, 2, 5, and 7).

The metering plates 6 are preferably made from a inert material, preferably at least physically and chemically inert relative to the solid particles 5 to be loaded. They are preferably made from plastics, polyamide PA6 or PTFE.

Figure 6:
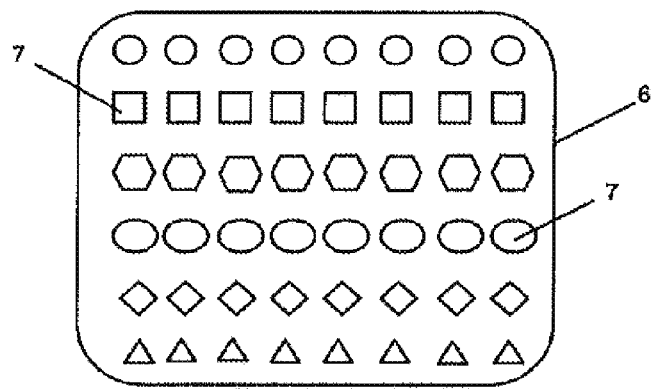
FIG. 6 is a schematic view in transverse section of a metering plate of the metering means comprising different forms of perforations.
Figure 7:
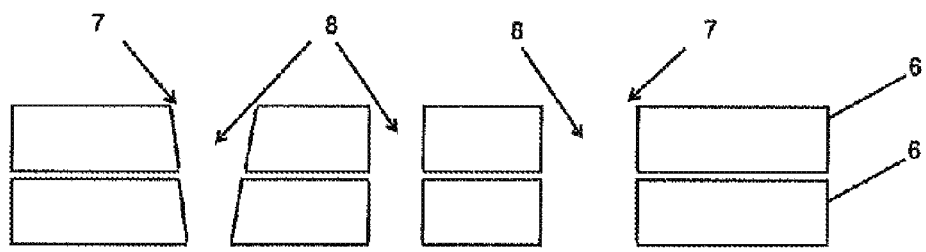
FIG. 7 is a schematic view in longitudinal section of two metering plates, one above the other, comprising different forms of perforation cross section.

The metering plates 6 have a form and suitable dimensions adapted to the device 1 according to the invention. In particular, the form and the thickness thereof are chosen as a function of the general form of the reactor, the number of chambers to be filled and, in particular, as a function of the quantity and/or volume of solid particles 5 to be charged. Preferably, the metering plates 6 have a parallelepipedal form, advantageously square or rectangular, or, alternatively, circular, and advantageously have a square or rectangular transverse section. They comprise at least two substantially continuous and substantially planar surfaces capable of entering into contact with at least one substantially continuous and planar surface of another, contiguous metering plate (FIGS. 6 and 7).

The metering plates 6 comprise at least one perforation 7, a through-hole through the thickness thereof. Preferably, they comprise a multitude of perforations 7 (FIGS. 6 and 7).

Figure 5:
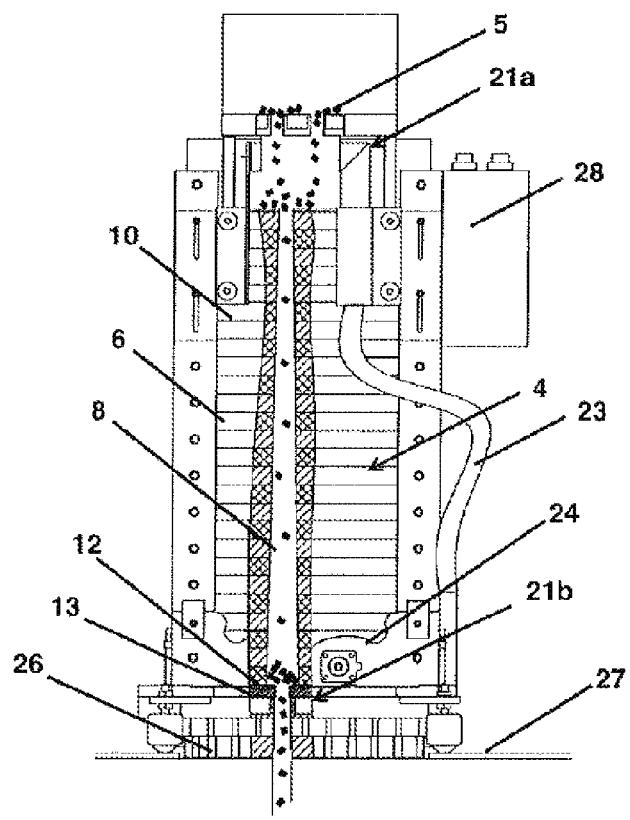
FIG. 5 is a schematic view of a longitudinal section of the embodiment shown in FIG. 3.

In the device 1 according to the invention, the metering plates 6 are arranged relative to one another substantially horizontally, in such a manner that the perforation or perforations 7 of one metering plate 6 is or are in connection with the perforation or perforations 7 of the metering plate 6 located below and/or above, with a view to forming at least one metering column 8, preferably the multitude of perforations 7 forming a multitude of metering columns 8, placed vertically or substantially vertically, and intended to be placed in connection with the chamber or chambers to be filled (FIG. 5).

The perforations 7 are of any suitable form and size, preferably coincident with the form of the chamber or chambers to be charged and/or with the form, the dimensions and the quantity of solid particles 5 to be received and thus to be metered.

Preferably, the perforations 7 have identical dimensions and form within one and the same metering plate 6 and/or from one metering plate 6 to another, both regarding the transverse section thereof and the longitudinal section thereof.

The perforations 7 may have a longitudinal section, thus in the thickness of the metering plates, of square, rectangular, trapezoidal, trapezium or right-angled trapezium form (FIG. 7). They may have a transverse section, thus at the surface of the metering plates, of round, ovoid, oval or elliptical form, of the form of a quadrilateral, a square, a rectangle, a trapezium, a lozenge, a triangle or of a polygon (FIG. 6).

In a particular embodiment of the invention, the perforations 7 have a circular transverse section with a diameter of between 30 and 36 mm.

Preferably, the perforations 7 have the form of a frustum of a cone or an inverted frustum of a cone.

Preferably, for a reactor having chambers of tubular form, the perforations 7 have a transverse section of circular form and a square, rectangular or trapezoidal longitudinal section.

In a particular embodiment, the perforations 7 have a transverse section of the same form and of the same dimension within one and the same metering plate 6, but have different dimensions from one metering plate 6 to another and, possibly, also a longitudinal section of different form.

Preferably, from the top toward the bottom of the metering means 4, the metering plates 6 comprise perforations 7 that have an increasing dimension, an increasing diameter in the case of the circular perforations, advantageously of the order of approximately 4% between two adjacent plates, which gives the metering column or columns 8 a substantially conical form (FIG. 5). Advantageously, the perforations 7 may also comprise a longitudinal section of trapezoidal form.

Metering columns 8 that have a conical form over all or part of the length thereof offer the advantage of improving the quality of their filling with solid particles 5, which improves metering, and also contributes to an enhanced discharge of the solid particles 5 in the chamber or chambers of the reactor.

Preferably, the device 1 according to the invention further comprises means 9 for vibration or oscillation of the metering means 4. Advantageously, these means comprise or implement at least one of the two metering plates 6, or a first series of metering plates 6, which is fixed relative to the frame 2 of the device 1, while a second plate 6 or second series of metering plates 6 is movable relative to the fixed metering plates 6. Preferably, the device 1 comprises as many movable metering plates 6 as fixed metering plates 6, the movable metering plate or plates 6 being arranged above and/or below a fixed metering plate 6. Preferably, the movable metering plate or plates 6 moves or move in a horizontal or substantially horizontal movement, preferably a back and forth or orbital movement, advantageously in a vibration or oscillation movement. The movable metering plates 6 move laterally relative to the fixed metering plates 6, without their perforations 7, in particular the aperture of the perforations 7 thereby being offset relative to those of the other metering plates 6. Preferably, the amplitude of the movement is chosen with a view to minimizing this offsetting effect so as not to disrupt the flow of solid particles 5 into the metering column or columns 8. This may, for example, be an amplitude of approximately 1 mm. However, in the embodiment in which the metering column or columns 8 have an aperture of conical form, this form offers the advantage of reducing, minimizing and even eliminating the impact of this offsetting of the metering plates 6 on the flow of solid particles 5, and the movement of one movable metering plate 6 relative to a fixed metering plate 6 may be greater.

Preferably, the means 9 for vibration of the metering means 4 comprise either one or a plurality of vibrators, or camshaft, the cams of which come into contact directly or indirectly with a part, preferably at least an edge, of the movable metering plates.

The use of movable metering plates 6 offers the advantage of unclogging the solid particles 5 at the entry and/or along the metering columns 8 in order to prevent their giving rise to clogging. Thus, the loading and unloading of the particles 5 in the metering means 4 is thereby improved, which makes it possible to obtain more efficient and constant filling of the chamber or chambers of the reactor.

Preferably, the device 1 comprises means for regulating metering, which makes it possible to regulate the quantity of solid particles 5 to be poured into the chamber or chambers of the reactor. Advantageously, these means are formed by or implement the metering means 4 themselves, in particular the metering plates 6 themselves. In effect, the implementation of the removable metering plates 6 allows regulation of metering via a regulation of the height of the metering column or columns 8. Thus, the number of metering plates 6 is chosen as a function of the quantity of solid particles 5 to be loaded into the chamber or chambers of the reactor. The removable plates 6 offer the advantage of thereby obtaining a device 1 that is rapidly and easily adaptable, not only in terms of the quantity of particles 5 to be loaded into one and the same reactor but also adaptable to the various types or forms of reactor.

The means for regulating metering may further comprise, or be formed by, a movable, possibly also removable, intermediate plate 10, complementing the removable metering plates 6 or substituting one of them. This movable intermediate plate 10 makes it possible to isolate a more or less significant portion of the metering column or columns 8. They also make it possible for the regulating means to pass from a "closed" position, in which the portion of the metering column or columns 8 is closed off, to an "open" position allowing the release of the solid particles 5 in said portion of the metering column or columns 8. Preferably, the movable intermediate plate 10 is movable in translation or in rotation, in a horizontal plane, to allow passage from the closed position to the open position, its actuation being achieved manually or automatically by electric or pneumatic means. Made from any suitable material, of suitable, preferably parallelepipedal, advantageously square, rectangular or circular, form, of square or rectangular transverse section, and having a thickness that is less than that of the metering plates 6, it is intercalated and slides between two metering plates 6 such as to close off a portion of the metering column or columns 8 and to allow the filling of said portion with solid particles 5 and then, when it is removed, to release a quantity of solid particles 5 that is smaller than that corresponding to a full height of a metering column.

Figure 8:
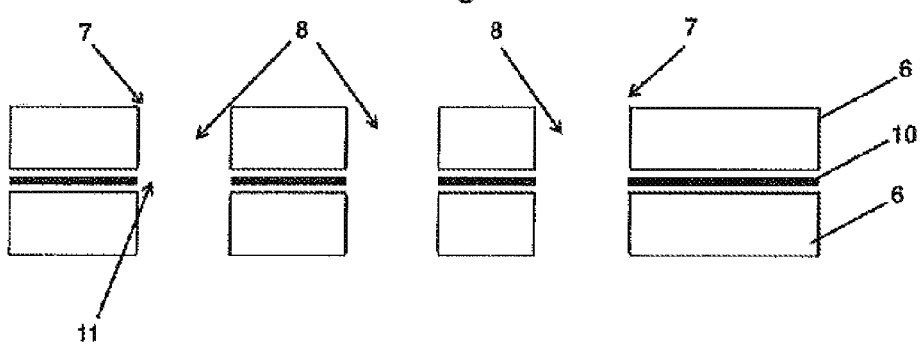
FIG. 8 is a schematic view in longitudinal section of the positioning of an intermediate plate of the metering regulating means, in the open position, in the metering means according to a particular embodiment of the invention.

The movable intermediate plate 10 may further comprise perforations 11, the closed position of the regulating means being obtained when the perforations 11 are not in connection with the perforations 7 of the metering plates 6, the open position being obtained by placing the perforations thereof in connection with those of the metering plates 6 (FIG. 8).

In a particular embodiment of the invention, in the closed position, certain perforations 11 of the movable intermediate plate 10 may be in connection with those of the metering plates 6 and others may not be in connection therewith, which offers the advantage of allowing metering that is differentiated between the chambers of one and the same reactor.

Preferably, and irrespective of the embodiment of the movable intermediate plate 10, movement of the latter is achieved either manually or automatically, preferably by electric or pneumatic drive means, for example of the ram type.

The use of a movable intermediate plate 10 offers the advantage of making it possible to make the device 1 according to the invention modular, for filling the chambers of one and the same reactor with different measures of solid particles 5, but also allows it to be made modular as a function of the type of reactors to be filled. Moreover, the device 1 offers the advantage of comprising a broad metering amplitude, the largest measure being that which corresponds to the maximum possible stack of the metering plates 6 and the smallest being that which corresponds to the thickness, and the size of the perforations 7, of a single metering plate 6, the movable intermediate plate 10 being arranged in the upper part of the metering means 4, between the first and second metering plate 6.

In a particular embodiment, all the metering plates 6 rest on a stainless-steel plate 12 fixed to the frame 2 and provided with one or more perforations in connection with the metering column or columns 8, the perforations having one or more forms and dimensions that are identical to or compatible with the perforations of the upper adjacent metering plate 6. This stainless-steel plate 12 allows holding of the simultaneous release means when the latter are actuated.

Preferably, the device 1 comprises means for simultaneous release of the solid particles from the metering means. Advantageously, these means are in the form of a movable, possibly also removable, release plate 13. This release plate 13 allows the metering means 4 to pass from a "inactive" or "closed" position, in which the lower end of the metering column or columns 8 is closed off, thereby allowing the filling thereof, to an "activated" or "open" position allowing the release of the solid particles 5 contained in the metering column or columns 8. Preferably, the release plate 13 is movable in translation or in rotation, in a horizontal plane, to make it possible to pass from the closed position to the open position. Made from any suitable material and having a thickness less than that of the metering plates 6, it is arranged below the metering means 4, preferably under the stainless-steel plate 12, in the embodiment in which this latter is present.

Preferably, the release plate 13 further comprises perforations, the "closed" position of the metering means 4 being obtained when the perforations are not in connection with, facing, those of the lower metering plate 6, and the "open" position being obtained when the perforations are aligned. These perforations may be of the same form and dimension as those of the metering plates 6, at least those of the lower metering plate 6. Nevertheless, they may be of a smaller size with a view to restricting the passage to one solid particle 5 at a time. For example, if the perforations of the metering plates 6 are circular and have a diameter of between 30 and 36 mm, the perforations of the release plate 13 may be circular and have a diameter of 12, 14, 16 or 18 mm. In this particular embodiment, the release plate 13 may be covered with a shock-absorbing liner with a view to minimizing any degradation of the particles owing to impact or ricochet, which might generate dust.

The means for releasing the solid particles 5 may be actuated either manually or automatically, preferably by electric or pneumatic drive means, for example of the ram type.

The device 1 according to the invention further comprises a storage tank 14 arranged at the top of the device 1 according to the invention, in the upper part of the metering means 4, and thus of the metering column or columns 8.

Figure 3:
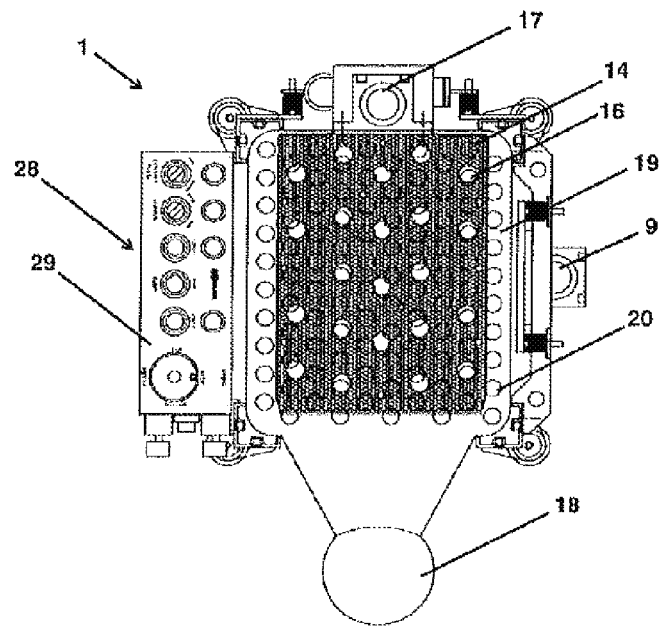
FIG. 3 is a schematic view from the top of the particular embodiment of the device shown in FIG. 1, in which the movable storage tank is in the lowered position.

The storage tank 14 has a form and dimensions that are suitable for and compatible with the device 1. It may have dimensions that are identical or substantially identical to those of the metering means 4, but it may also be smaller, as shown in FIG. 3.

The storage tank 14 is preferably movable, advantageously removable, which offers the advantage of facilitating access to the metering means 4. In a particular embodiment, the storage tank 14 is movable by virtue of means forming a hinge 15 allowing pivoting thereof relative to the frame 2 of the device 1, from a "raised" position to a "lowered" position, which is the normal position of use of the tank for filling the metering means and may assume all intermediate positions.

Irrespective of the embodiment of the storage tank 14, this latter comprises a bottom comprising perforations 16, or through-holes, and unloading means.

In a particular embodiment, the unloading means are formed by or implement the perforations 16 of the storage tank 14. These means are "inactivated" or "closed" when the perforations 16 are not opposite or in connection or only partially so with the opening of the metering columns 8 (FIG. 3). These means are generally in the "closed" position before and during receipt of the solid particles 5 in the storage tank 14.

In another particular embodiment, the perforations 16 in the bottom of the tank 14 are opposite to the upper opening of the metering columns 8 and the unloading means comprise an unloading plate that obstructs them. The unloading plate is movable, preferably in translation or in rotation, advantageously in a horizontal plane, and it is optionally also removable. It may pass from a "closed" position, in which the solid particles 5 are retained in the storage tank 14, to an "open" position allowing the release of the solid particles 5 from the tank 14 into the metering column or columns 8.

Thus, the unloading means offer the advantage of allowing controlled filling of the metering column or columns 8, while preventing too-rapid filling thereof. In effect, when the solid particles 5 in the storage tank 14 are poured out, and owing to the presence of perforations in the bottom of the storage tank, the metering column or columns located directly under the flow of the solid particles 5 are likely to be subject to clogging or, owing to the force of the flow, to be filled with more solid particles 5 through a settling effect than metering columns 8 located at the periphery.

Preferably, the storage tank 14 further comprises or interacts with means 17 for vibration or oscillation, making it possible to impart a horizontal or substantially horizontal movement, preferably a back and forth movement or an orbital movement, to the storage tank 14. These vibration means 17 comprise or are formed by, for example, a vibrator or a set of cams that can move about an axis and come into contact, directly or indirectly, with a part, preferably at least a wall forming the edge of the storage tank 14. Advantageously, these vibration means 17 may be identical to or share all or some of the means 9 for vibration of the metering means 4, and in particular, in the case of the embodiment implementing cams, the axis of rotation thereof is preferably also that of the cams of the means 9 for vibration of the metering means 4.

Thus, like the metering means 4 according to the invention, the storage tank 14, with these unloading means and the means 17 for vibration or oscillation of said tank 14, contribute to preventing the formation of clogging at the metering column or columns 8. Consequently, the loading and unloading of the solid particles 5 in the metering column or columns 8 are more efficient and constant and the filling of the chamber or chambers of the reactor is thereby improved.

The device 1 preferably comprises means for discharging the surplus solid particles from the metering means. These means comprise, for example, a scraper or a brush for leveling off the top of the metering column or columns 8, a pouring spout 18 positioned at the upper metering plate 6, and a recovery tank arranged under the pouring spout 18 and receiving the excess solid particles 5 via said pouring spout 18, in order that the solid particles 5 thus recovered can be used again at the time of a subsequent loading.

Figure 4:
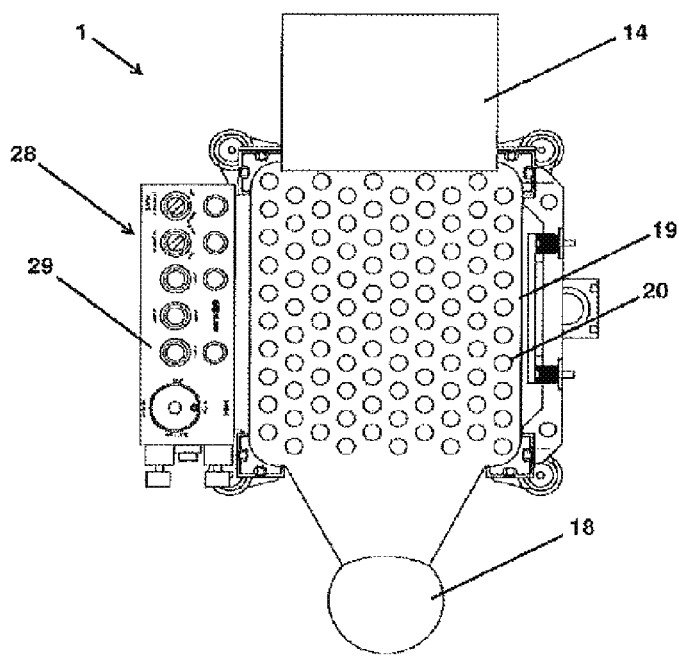
FIG. 4 is a schematic view from the top of the particular embodiment of the device shown in FIG. 1, in which the movable storage tank is in the totally raised position.

The means for discharging the surplus solid particles may form an integral part of the storage tank 14, it being possible, for example, for the pouring spout 18 to be arranged on or incorporated into one of the walls of the storage tank 14. However, it may also be envisaged that these discharge means comprise a plate 19, 1 to 5 mm thick, for example, comprising perforations 20 with a form or forms and with dimensions that are identical or compatible with the perforations of the upper metering plate, a plate 19 having a suitable form and dimensions to be arranged above the upper metering plate 6 and under the bottom of the storage tank 14, when the latter is in the lowered position, the plate 19 comprising, on one of its edges, the pouring spout 18 allowing the discharge of the excess solid particles 5 (FIGS. 3 and 4).

The device 1 according to the invention comprises means 21 for recovering the dust formed by and during the use of the device 1 according to the invention. These means 21 are arranged both at the storage tank 14 of the solid particles 5 and at the junction between the metering means 4 and the chamber or chambers of the reactor, which offers the advantage of significantly improving the protection of the operative of the device 1 according to the invention against dust production.

The first and second means 21a and 21b for recovering dust may be identical or different, depending on whether they are located at the top or at the bottom of the device 1.

Preferably, the first means 21a for recovering dust, located at the storage tank 14, comprise at least one air inlet, at least one air outlet, and means for generating a circulation of air comprising, for example, a fan or an aspirator 22 and conduits 23.

In a particular embodiment of the storage tank 14, the air inlet of the first means 21a for recovering dust is formed on the bottom of the storage tank 14 and also over all or part of the surface of at least one lateral wall of the storage tank 14, the air outlet being formed in a lateral wall of the storage tank 14 and in communication with the through-holes in the aperture of the perforations 16 of the bottom of the storage tank 14 via which the solid particles 5 circulate toward the metering means 4.

Preferably, the second means 21b for recovering dust, located between the metering means 4 and the chamber or chambers of the reactor, advantageously located under the means for simultaneous release of the solid particles 5, under the release plate 13, comprise at least one air inlet, preferably formed on the edge face of the frame 2 of the device 1, and at least one air outlet and means for generating a circulation of air, which may be identical to or be those of the means 21a for recovering dust of the storage tank 14.

In a particular embodiment of the invention, the second means 21b for recovering dust comprise dust recovery orifices arranged right around the holes in the release plate 13 and around the holes in the stainless plate on which the metering means 4 rest. Thus, the dust from the particles 5 can easily pass through the dust recovery orifices to arrive directly in the zone of the suction compartment.

Preferably, the second means 21b for recovering dust comprise control means allowing the implementation of the first means and/or of the second means for generating a circulation of air. Preferably, these control means comprise a valve 24, advantageously a three-way valve, controlled manually or automatically by control means, which may comprise a ram 25 (FIGS. 1 and 5).

In a particular embodiment, the second means 21b for recovering dust comprise a three-way valve 24 comprising a steel tube, of 60 mm diameter, for example, and comprising an opening, preferably an elliptical opening, made, for example, by drilling. One end of this tube is obstructed while the other is connected to a suction hose 23 which is itself connected to a suction unit 22. This tube is pivot-linked in a frame made from plastics, comprising two conduits. The tube may be rotated about its axis by virtue of a ram 25. According to the "retracted" or "emerged" position of the rod of the ram 25, the tube may assume at least two distinct angular positions. In one of the positions, the elliptical opening faces one of the conduits, and in the other the opening faces the other conduit. The first conduit is connected to the lower suction unit, while the other conduit is connected to the suction unit of the storage tank 14. Thus, according to the angular position of the tube of the three-way valve 24, suction is oriented either toward the lower part or toward the upper part of the device 1.

The device 1 according to the invention may further comprise means for positioning the metering column or columns 8 in connection with the chamber or chambers of the reactor to be loaded.

In a particular embodiment, these positioning means are formed by or comprise a centering plate 26 that offers the advantage of aligning the metering column or columns 8 above the opening of the chamber or chambers of the reactor to be filled. Preferably, the centering plate 26 is connected to the frame 2 by means of a plurality of pivot/sliding links that enable it to be movable vertically relative to the frame 2. Upon movement of the device 1 according to the invention, the centering plate 26 is in the top position and when the device 1 is ready to unload the solid particles 5 it passes into the bottom position in order to come into contact with the top of the chambers of the reactor. Thus, once the centering plate 26 is in contact with the reactor, the device according to the invention is held in position.

Preferably, the form of the contour of the centering plate 26 is identical to that of a possible sealing plate 27 for protecting the one or more chambers to be loaded. For example, it may be substantially square or rectangular, cover three, six or ninety nine chambers of the reactor, and have a width and a length of between 4 mm and 42 mm for a thickness of approximately 5 mm. Two sides of this centering plate 26 may have a contour of saw-tooth form, it being possible for the other two sides to be crenelated.

The device 1 according to the invention may further comprise means 28 for controlling the various means forming the device 1 according to the invention. They may comprise software and/or hardware means. For example, they may comprise a control panel 29 that makes it possible to activate or deactivate the various functions of the device 1, a microprocessor, with a view to automating certain functions such as displaying information or preventing certain functioning sequences.

The device 1 according to the invention is particularly adapted to the metering and the filling of at least one chamber, advantageously a multitude of chambers, of a fixed catalyst bed reactor, with solid particles 5 in the divided state, preferably catalyst particles 5 in the form of balls, cylindrical granules, rods or pellets.

The device 1 makes it possible to fill one, ten, twenty or one hundred chambers simultaneously such as to cover the surface or a sector of the surface of a catalytic reactor as efficiently as possible. Preferably, the device 1 for filling one hundred tubes is adapted to fill the chambers of the central zones of a catalytic reactor and the devices of one, three or twenty chambers are particularly adapted to fill the peripheries of the reactor. The device according to the invention may also be readily dimensioned to fill more than one hundred chambers simultaneously.

In the case of a device 1 for filling and metering solid particles 5, it is advantageous to make provision for a preliminary step of calibration, of regulation of the quantity of solid particles 5 to be loaded into the chamber or chambers prior to filling thereof. To that end, the user may adjust the height of the metering columns 8 by adding or removing metering plates 6 and/or by using an intermediate plate 10 arranged between metering plates 6 such as to form a given height for a metering column 8. Indeed, the thickness of the metering plates 6 and the dimension of their perforations 7 being known, it is easy to adapt the height of the metering columns 8 to the volume of solid particles 5 to be used to fill the reaction chamber or chambers.

Preferably, after having checked that the chamber or chambers of the reactor are empty, the operative sets in place a plate or a group of plates, called sealing plates 27, advantageously made from plastics, temporarily closing off the chamber or group of chambers. In the case of a multitude of sealing plates 27, it may be advantageous to make provision for them to be of different colors so that the operative is able easily to identify the various zones of the reactor, it being possible for certain zones to be filled to be marked in a certain color, the filled zones in another color, and the zones to leave empty in a third color. It is also possible to make provision such that, after the loading of a zone, a color code identifies it as a loaded, but not checked, zone. For the calibrating step, the operative removes the colored sealing plate 27, checks the loading height of solid particles 5 with one or more rods, rectifies loading if required and then re-closes the loaded, checked chambers with a sealing plate 27 in another color or the same sealing plate 27 comprising a mark in another color. Thus, as a function of the color of the sealing plates 27 or of the marks attached to the sealing plates 27, the operative knows whether the chambers located below are empty or loaded and not checked or loaded and checked.

When the device 1 is positioned above the chamber or chambers, the sealing plate or plates 27 of the reactor is or are removed and the centering plate 26 is implemented with a view to correctly positioning the metering column or columns 8 of the device 1 above the opening of the chamber or chambers. The centering plate 26, which preferably has the same form as the sealing plate 27, is then immobilized in horizontal translation by the sealing plates 27 surrounding the removed sealing plate 27, which makes it possible to position and to hold the device 1 correctly opposite to the chambers of the reactor.

Filling of the device 1 with the solid particles 5 may take place prior to its presentation above the chamber or chambers or, alternately, when it is already in position for filling same. In both cases, the means for simultaneous release of the solid particles 5 are not activated and are thus in the closed position, during loading with solid particles 5.

The operative pours the solid particles 5 into the storage tank 14 of which the perforations 16 of the wall thereof forming the bottom are not opposite to the aperture of the metering columns 8 or are closed off by the unloading means, the storage plate being in its closed position. The operative then manually distributes the solid particles 5 in the storage tank 14 or implements the means 17 for vibration of the storage tank 14, in such a manner as to obtain a homogeneous thickness of solid particles 5 in the tank 14, subsequently releasing them into the metering column or columns 8, placing the perforations 16 of the bottom of the tank in connection with the opening of the metering column or columns 8 or actuating the unloading plate so as to cause it to pass into the open position, it being possible for the means 17 for vibration of the storage tank 14 to be activated during this step.

Before or during pouring of the solid particles 5 and/or activation of the means 17 for vibration of the tank 14 and/or release of the particles into the metering column or columns 8, the operative may implement the means 21a for recovering dust at the storage tank.

The metering column or columns are filled until the solid particles 5 are flush with the upper opening of the metering column or columns 8, preferably when they are flush with the bottom of the storage tank 14, it being possible for the means 9 for vibration of the metering means 4 to be activated before and/or during this step.

The operative then discharges the excess solid particles 5 remaining at the last metering plate 6, preferably using a scraper or a brush, toward a pouring spout 18 in the form of a funnel in communication with a recovery tank.

Once the metering columns 8 have been filled, the operative is able to pour the solid particles 5 into the chamber or chambers of the reactor, implementing the movable intermediate plate 10 of the means for regulating metering, if necessary, and the movable release plate 13 of the means for release of the solid particles 5, preferably implementing the means 9 for vibration of the metering means, and advantageously also implementing the second means 21b for recovering dust that are located at the junction between the metering means 4 and the chamber or chambers of the reactor.

When the metering column or columns are empty, the operative is able to stop the means 9 for vibration of the metering means 4 and the second means 21b for recovering dust and to reposition the release means and, if necessary, the means for regulating metering, into the closed position.

Preferably, the operative inspects the filling height of each chamber with a view to inspecting the loading thereof. If the chamber or chambers of the reactor just filled is or are insufficiently filled in one loading, the operative repeats the operations described above, optionally with the exception of the step of calibrating the metering means 4, until the required height of solid particles 5 in the chamber or chambers of the reactor has been obtained.

Once the required height of solid particles 5 has been obtained, after possibly a further inspection of the height of the solid particles 5 in the chamber or chambers, the operative removes the device 1 and raises the centering plate 26. Preferably, he closes off the filled chambers using a sealing plate 27.

The invention claimed is:

1. A movable device for filling one or more chambers with solid particles in the divided state, said device comprising:
   a movable frame,
   means for metering said solid particles, comprising two or more metering plates comprising one or more perforations, said metering plates being arranged one on top of another such that the perforation or perforations of one metering plate is or are in connection with the perforation or perforations of the adjacent metering plate such as to form one or more metering columns intended to be placed in connection with said chamber or chambers,
   means for simultaneous release of said solid particles from said metering means toward said chamber or chambers,
   a storage tank for storing said solid particles that comprises a bottom wall comprising perforations that are or may be placed in connection with said metering column or columns, and comprising unloading means that release said solid particles from said storage tank toward said metering column or columns.

2. The device as claimed in claim 1, wherein a first one of the two or more metering plates comprising one or more perforations, or a first series of said metering plates, is or are fixed relative to the frame of said device, and another of said metering plates, or a second series of said metering plates, is or are movable relative to said first metering plate or first series of said metering plates, in a substantially horizontal movement.

3. The device as claimed in claim 2, wherein the movement of the movable metering plate or plates is achieved by a camshaft, the cams of which come into contact with at least one edge of said movable plate or plates.

4. The device as claimed in claim 1, comprising means for leveling the metering of solid particles comprising a movable, optionally removable, intermediate plate passing from a "closed" position, in which a portion of the metering column or columns is closed off, to an "open" position, allowing the release of the solid particles in said portion of the metering column or columns, and vice versa, or said leveling means being formed by the metering plates, all, or only some, of which are removable.

5. The device as claimed in claim 4, wherein the movable intermediate plate comprises perforations that, when said movable intermediate plate assumes the "closed" position, are not in connection with the metering column or columns and are in connection with said metering column or columns when said movable intermediate plate assumes the "open" position.

6. The device as claimed in claim 1, wherein the metering column or columns has or have a substantially conical form.

7. The device as claimed in claim 1, wherein the means for unloading the storage tank comprise a movable unloading plate passing from a "closed" position, in which the solid particles are held in said storage tank, to an "open" position allowing the release of said solid particles from said storage tank toward the metering column or columns, and vice versa, or said unloading means are formed by perforations of said storage tank that are not or are only partially opposite to the opening of said metering column or columns before and during receipt of the solid particles in said storage tank.

8. The device as claimed in claim 1, further comprising means for recovering the dust formed by and during the use of said device, comprising first means arranged at the storage tank of the solid particles and second means arranged at the junction between the metering means and the chamber or the chambers.

9. A method for metering and filling one or more chambers, comprising the following steps:
   taking the device as claimed in claim 1 and arranging said device above said chamber or chambers such that the metering column or columns is or are in connection with the upper opening of said chamber or chambers, pouring solid particles in the divided state into the storage tank, the unloading means of which are in the closed position, the simultaneous release means being inactivated, distributing said solid particles in said storage tank, activating the unloading means such as to release the solid particles into the metering column or columns, filling said metering column or columns with said solid particles until flush with the bottom of said storage tank or flush with the upper opening of said metering column or columns, discharging the surplus of said solid particles from said storage tank toward a recovery tank, opening the means for simultaneous release of said solid particles such as to fill said chamber or chambers and closing said means when said chamber or chambers is or are filled.

10. The metering and filling method as claimed in claim 9, further comprising a step of activating a means for vibration or oscillation of the storage tank before and/or during the activation of the unloading means and/or a step of activating a means for vibration or oscillation of the metering means before and/or during the filling and/or the unloading of the metering column or columns.

11. The metering and filling method according to claim 9, further comprising a step of activating a means for recovering the dust at the storage tank during the step of pouring the solid particles into said storage tank and/or during the activation of the unloading means and/or a step of activating the means for recovering the dust at at-the junction between the metering means and the chamber or the chambers.

12. The metering and filling method as claimed in claim 9, further comprising a preliminary step of calibrating the device by adjusting the height of the metering column or columns, adding or removing metering plates and/or using an intermediate plate arranged between metering plates such as to form a given height for a metering column, said intermediate plate passing from the closed position to the open position before or concomitantly with the activation of the simultaneous release means.

13. The metering and filling method as claimed in claim 9, further comprising a step of checking the filling of the chamber or of the chambers and, if the filling thereof is insufficient, repeating the steps of the method as claimed in claim 9, with the exception of the step of calibrating the device, until the required height of solid particles in said chamber or chambers has been achieved.

* * * * *